(12) United States Patent
Schlegel

(10) Patent No.: US 6,993,368 B2
(45) Date of Patent: Jan. 31, 2006

(54) HANDS-FREE DEVICE FOR OPERATING MOBILE TELEPHONES IN MOTOR VEHICLES WITH A MODULE-CHANGING MECHANISM

(75) Inventor: Thomas Schlegel, Nürnberg (DE)

(73) Assignee: Audioton Kabelwerk GmbH Zweigniederlassung Scheinfeld, (DE)

( * ) Notice: Subject to any disclaimer, the term of this patent is extended or adjusted under 35 U.S.C. 154(b) by 70 days.

(21) Appl. No.: 10/506,804

(22) PCT Filed: Mar. 5, 2003

(86) PCT No.: PCT/DE03/00687

§ 371 (c)(1),
(2), (4) Date: Sep. 7, 2004

(87) PCT Pub. No.: WO03/077514

PCT Pub. Date: Sep. 18, 2003

(65) Prior Publication Data

US 2005/0113150 A1    May 26, 2005

(30) Foreign Application Priority Data

Mar. 8, 2002  (DE) .............................. 102 10 098

(51) Int. Cl.
*H04M 1/00* (2006.01)
*H01R 24/00* (2006.01)

(52) U.S. Cl. .............................. 455/569.2; 455/575.1; 455/128; 439/630

(58) Field of Classification Search ............. 455/569.2, 455/575.1, 128; 439/630; 379/330
See application file for complete search history.

(56) References Cited

U.S. PATENT DOCUMENTS

| 5,333,176 A | * | 7/1994 | Burke et al. ................. 455/557 |
| 5,555,448 A | * | 9/1996 | Thiede et al. ............... 455/74.1 |
| 5,754,962 A | * | 5/1998 | Griffin ...................... 455/569.2 |
| 5,836,496 A | * | 11/1998 | Levin et al. ................. 224/553 |
| 5,907,796 A | * | 5/1999 | Matchett et al. ......... 455/575.9 |
| 6,138,041 A | * | 10/2000 | Yahia ....................... 455/569.2 |
| 6,631,201 B1 | * | 10/2003 | Dickinson et al. .......... 382/124 |
| 2002/0132527 A1 | * | 9/2002 | Ito et al. ..................... 439/630 |

FOREIGN PATENT DOCUMENTS

DE          44 07 125          9/1995

(Continued)

*Primary Examiner*—William Trost
*Assistant Examiner*—Kiet Doan
(74) *Attorney, Agent, or Firm*—Fulbright & Jaworski LLP

(57) ABSTRACT

The invention discloses a mobile telephone device as part of a hands-free device in a motor vehicle. Known mobile telephone devices can be expanded only to a limited extent in their functions and functionalities by connecting peripheral devices such as for example headphone-microphone combinations. The new mobile telephone device is to be flexibly expandable by components or functionalities. For that purpose a base member (1) has a receiving means (8) for receiving a module unit (20). The module unit (20) is conductingly connected to the control device by a connecting device (21) with contact elements at the module side and contact elements at the receiving means side. The module unit (20) has analog and/or digital function units and/or analog memory units. The module unit can be for example in the form of an expansion card or memory card. By inserting a module unit (20) into the mobile telephone device it is expanded by the function which is predetermined by the respective module unit (20). By changing the module units the selection of the available functions of the mobile telephone device can be flexibly altered.

20 Claims, 2 Drawing Sheets

FOREIGN PATENT DOCUMENTS

Figure 1:
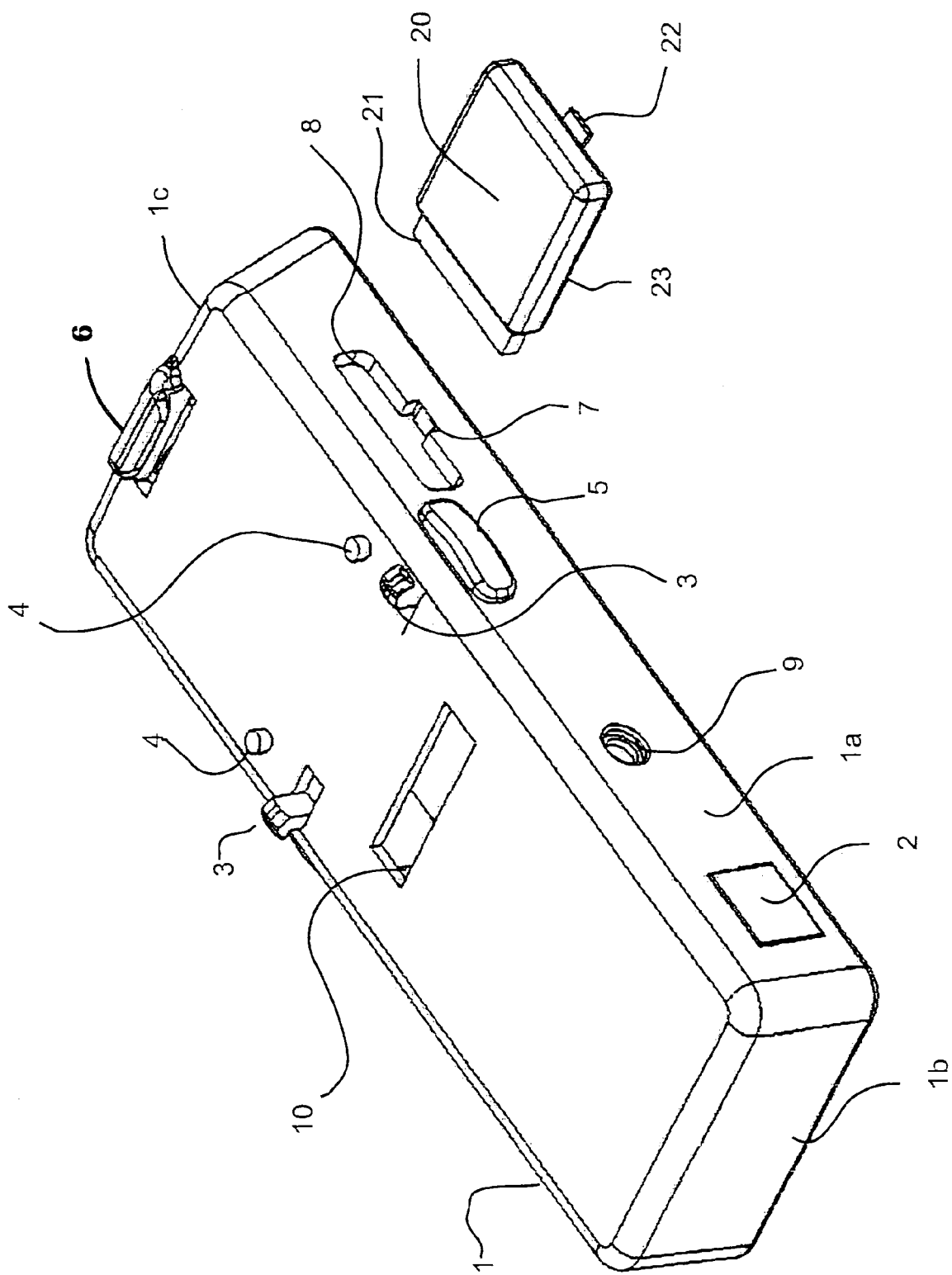

| | | |
|---|---|---|
| DE | 44 28 068 | 2/1996 |
| DE | 199 17 169 | 11/2000 |
| DE | 100 60 338 | 9/2001 |
| EP | 0 720 338 | 7/1996 |
| WO | WO 98/26562 | 6/1998 |
| WO | WO 00/59247 | 10/2000 |
| WO | WO 01/61875 | 8/2001 |

* cited by examiner

HANDS-FREE DEVICE FOR OPERATING MOBILE TELEPHONES IN MOTOR VEHICLES WITH A MODULE-CHANGING MECHANISM

The invention concerns a mobile telephone device as part of a hands-free device in a motor vehicle, for example private automobiles, heavy goods vehicles and other utility vehicles, comprising an electronic control device for the hands-free device, a base member which can be installed in the motor vehicle and an interchangeable holding member for temporarily receiving a mobile telephone, wherein the base member has a mechanical connecting device and/or an electrical and/or electronic contacting device for the holding member.

Mobile telephone devices for the operation of mobile telephones in motor vehicles serve as holding means for mechanically receiving mobile telephones and have a large number of functions for enhancing vehicle safety and operational comfort and convenience.

Mobile telephone devices of that kind are described in DE 100 60 338 A1. They have a base member which is connected in fixed relationship with the vehicle and which is secured to the instrument panel, to the central console or in the armrest of the respective vehicle, and on to which a telephone holding member is temporarily fitted by a hook mechanism or a bayonet mechanism. That holding member—also referred to as the cradle—into which the mobile telephone is fitted is of a mobile telephone-specific configuration, while the base member is independent of the respective configuration of the mobile telephone. In an embodiment described in DE 100 60 338 A1 the base member is temporarily connected electrically or electronically to the holding member by contacting devices in the form of for example contact pins which are disposed at the base member side and which engage into receiving means at the holding member side. In a further embodiment, the holding member is connected by a cable to an interface box which operates as a control device and which, as an additional system component, is disposed outside the base member and is mechanically not rigidly connected thereto.

The known mobile telephone device, by way of the externally disposed interface box, has an electrical connection to the on-board vehicle network system with a vehicle bus which in turn can be connected to further components such as for example a voice recognition means, a microphone or a loudspeaker. There is no provision for expanding or retro-fitting functionalities directly on the mobile telephone device.

The object of the present invention is that of forming a mobile telephone device which can be flexibly expanded by components or functionalities.

In a mobile telephone device of the kind set forth in the opening part of this specification, that object is attained in that there is provided at least one module unit which forms an expansion means and/or a data memory and which has an analog function unit and/or a digital memory device and/or a digital function unit, wherein the base member and/or the holding member has a receiving means for the module unit, that the module unit can be inserted into the receiving means while the base member is installed in the motor vehicle, wherein the receiving means has electrical and/or electronic contact elements at the receiving means side and the module unit which can be releasably inserted into the receiving means has electrical and/or electronic contact elements at the module side, which are arranged in corresponding relationship with the contact elements at the receiving means side, and that when the module unit (20) is engaged in position it is conductingly connected to the control device by way of the contact elements.

That mobile telephone device makes it possible for the user to insert module units temporarily into a receiving means of the mobile telephone device or to interchange them flexibly therein. The change in module units affords the user various functionalities in connection with the mobile telephone device.

The module unit is a component which can be temporarily connected to the mobile telephone device, in particular in such a way that it can be fitted into or removed from the mobile telephone device without the use of tools and/or with a simple manual sequence of movements and/or while the base member is installed in the vehicle and/or while the holding member is connected to the base member and/or while the mobile telephone is inserted into the holding member. That ensures that the user can insert, remove or change a module unit, without modifications or conversions on the mobile telephone device.

The module unit has a connecting device which serves for mechanical and/or electrical/electronic coupling. To provide the electrical/electronic coupling the module unit has module-side contact elements, which for example can involve contact pins, receiving members and/or flat contacts. The arrangement of the contact elements is of a corresponding configuration, in the sense of a plug or a socket, in relation to the contact elements at the receiving means.

Further elements for mechanical coupling can be provided on the module unit, such as guide means, locking devices but also pins or receiving members for fixing elements.

The module unit can have various electrical, electronic or mechatronic structural groups. They provide the various additionally available functionalities of the mobile telephone device.

Possible configurations of the module unit have an analog function unit in the form of an analog circuit or input and output devices such as control and display lights, transmitting and receiving devices as are used in relation to infrared interfaces or Bluetooth connections, or receiving devices as are used for GPS navigation systems. In addition it is possible to provide a digital memory device which contains items of information, for example navigation data such as co-ordinates, destination data or distance data, or personal information, to the same or similar extent with addresses, dates, e-mail, tasks etc, as are also stored for example in PDAs (personal digital assistants) or appointments programs (for example Microsoft Outlook 2000), but also authorisation information in the sense of a key or an identification password for example for enabling operation of the mobile telephone device or for the transfer of personal settings. Commands or programs can also be stored in the digital memory device as a constituent part of a more complex structural group. The digital memory unit can also receive items of information and thereby permit for example data exchange. It can also have a digital function unit in the form of a digital computing device which can communicate with the control device by digital signals in order to enhance the computing power of the control device in the sense of a parallel or master-slave computer structure or to permit computing operations in hardware-adapted fashion by coupling processors of various kinds such as microcontrollers, digital signal processors and 16 and 32-bit processors.

A combination of all the above-indicated structural groups or parts thereof is a preferred embodiment of the invention.

The base member has a receiving means which is preferably provided at the longitudinal side or the narrow end.

It can however also be provided at the top side of the base member or even in the holding member.

The receiving means has contact elements at the receiving means side, which are complementary in terms of configuration and arrangement to the contact elements at the module side.

Further elements for mechanical coupling can be provided on the receiving means, such as guides, locking devices but also pins or receiving members for fixing elements.

The receiving means, to withstand mechanical damage or fouling, can have a cover device which is resiliently mounted and/or which opens automatically upon insertion of the module unit into the receiving means and which in particular is opened when the module unit is inserted.

A preferred configuration of the invention is provided if the module unit is a one-piece structural unit and/or is of a closed shape. The module unit comprises a base body and a connecting device which is connected thereto and which can be integrated in the base body or which can be fitted to the base body. In a preferred embodiment the base surface of the base body is of a square or rectangular cross-section. The module unit can also be in the form of a bar, a sphere or another volume body.

The module unit is to be a component which is easy to transport and which can also be kept in the pants pocket or in the form of a pendant on a key ring. All electrical connections extending therein end either in the module unit itself or in the module-side contact elements, so that the module unit does not have any further electrical connecting elements such as for example cables or cable connections.

In a preferred development of the invention the module is adapted to be inserted without using a tool and without actuation, in particular without dismantling, of housing portions. Thus a particular advantage is that the user can insert the module himself without having to carry out manipulation operations on the housing, for example screwing it on or levering it on. The module unit can be introduced into the base member, with the base member being in the condition of being ready for operation and/or installed.

It is advantageous if the module, in the inserted condition, protrudes from the base member. If the module unit projects by a few millimeters, in particular up to 10 mm, then the operator can readily perceive visually or by touching and feeling the resulting projection whether a module unit has been inserted. If the module unit is projecting more it can be particularly easily removed from the mobile telephone device by being gripped with the thumb and two fingers and then being pulled out of the mobile telephone device.

An advantageous configuration of the invention provides that the base member has an unlocking and/or ejection device for unlocking and/or ejecting the module unit. Alternatively or additionally to manual removal by simply pulling it out, insertion and removal of the module unit is simplified by such a device which can be formed by way of a lever mechanism or a spring mechanism. Upon insertion of the module unit it is possible to ensure by activation of the unlocking or ejection device, for example by way of a contact switch, whether the module unit is positioned correctly in the base member. By virtue of a suitable design of the mechanical system as is used for example in relation to 3.5" floppy disk drives, the force to be applied for inserting and removing the module unit can also be reduced.

A particularly inexpensive alternative way of ensuring removability of the module unit involves providing the module unit with a tab of a thin elastic material, by means of which the module unit can be pulled out of the base member. That tab for example comprises paper or a plastic film, preferably a polyester film. The tab is glued to the top side or the underside of the module unit and in its width preferably terminates in positively locking relationship with the external shape of the module unit. On the side of the module unit which is directed outwardly upon insertion into the base member the tab projects beyond the module unit so that it is possible for the user to grip the tab and to cause the module unit to be pulled out of the base member, by pulling on the tab. With such a configuration for the module unit, the module unit can terminate in the inserted condition in positively locking relationship with the external shape of the base member. The module unit can be pulled out of the base member by means of the tab even without using an unlocking and ejection mechanism.

In order to make it easier to operate the mobile telephone device, the receiving means has a mechanical guide and/or the shape of the opening of the receiving means is of a rectangular configuration. The mechanical guide which can be in the form of a groove or can be afforded by a centering geometry of the receiving means avoids incorrect positioning of the module unit in the receiving means. The correct orientation of the module unit upon insertion thereof is ensured by the rectangular or trapezoidal shape of the opening.

In a preferred development of the invention the mobile telephone device can be characterised in that the base member has a processor. In that way the electrical/electronic interfaces disposed on the base member, in particular the receiving means, can be connected to a processor of the control device directly without cables which extend outside the base member. The entire control device can also be integrated in the base member.

The level of flexibility of the mobile telephone device is further enhanced if the base member is designed to be independent of the type of mobile telephone and the holding member is designed to be specific for the type of mobile telephone. The holding member—also referred to as the cradle—is adapted in its design configuration of the external shape and in its electrical connecting devices to the respective mobile telephone. In contrast the base member which is installed fixedly in the vehicle can be designed independently of the respective mobile telephone as the cradle acts as a mechanical and electrical/electronic adaptor device. Upon a change in the type or model of mobile telephone accordingly only the cradle has to be replaced, while the other, fixedly installed part of the mobile telephone device can remain in and be further used in the vehicle.

Figure 2:
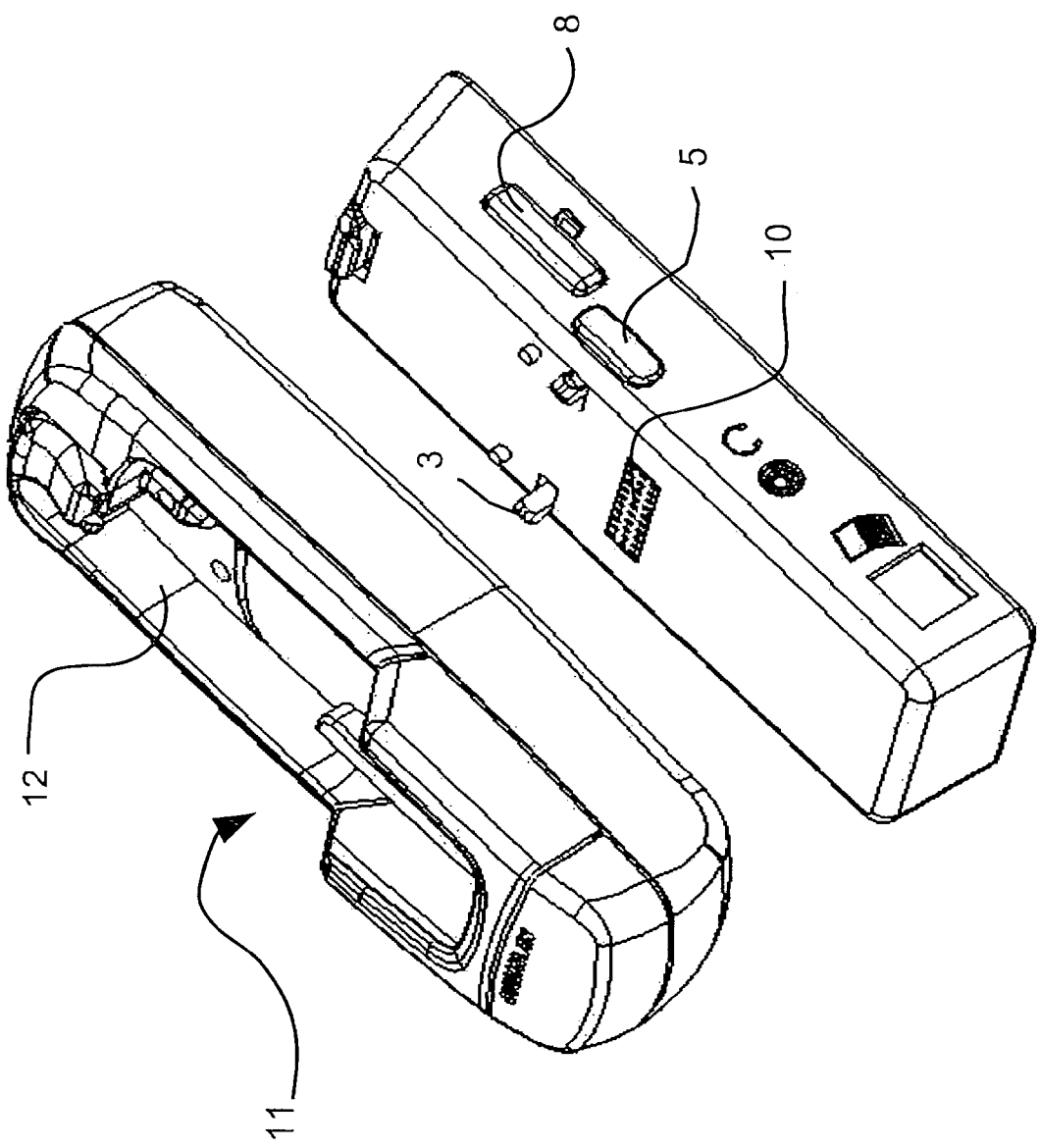

Further details, advantages and features will be apparent from the description hereinafter of an embodiment by way of example and from the drawings in which:

FIG. 1 is a diagrammatic perspective view from above of a base member and a module unit of an embodiment by way of example, and FIG. 2 is a diagrammatic view of a holding member of the FIG. 1 embodiment.

FIG. 1 is a diagrammatic view of a base member 1 and a module unit 20 of an embodiment by way of example of a mobile telephone device which is part of a hands-free device. A hands-free device makes it possible to telephone while actively being involved in traffic without being distracted from what is happening in the traffic insofar as a loudspeaker and a microphone are additionally provided outside the mobile telephone, preferably being fitted in the interior of the vehicle. The driver can now carry on a telephone conversation as in normal conversation with a passenger without having to hold a telephone receiver.

The base member 1 is fixedly installed in the vehicle, for example on the central console or the armrest. Temporarily fitted on to the base member 1 is a holding member which, as in the illustrated embodiment of FIG. 2, is in the form of a cradle 11. The holding member 11 which is in the form of the cradle has a receiving means 12 for the mobile telephone which is not shown in FIG. 2, and is mobile telephone-specific in design.

The base member 1 is of an elongate, plate-shaped external contour, the base surface of which substantially corresponds to the outside dimensions of a mobile telephone and of which one end 1c is bevelled. The height of the base member is such that on the one hand there is sufficient the same time the rigid latching pins 4 also engaging into corresponding latching recesses, of a complementary configuration, at the underside of the holding member 11.

Arranged on the top side of the base member 1 for the electrical/electronic connection between the cradle and the base member 1 is a contacting device 10. Provided on the side faces are further interfaces, namely a data interface 2, for example for the connection to further parts of the control device or to external bus systems, and an audio connection 9, for example for connection to a headphone or to a headphone-microphone combination (headset).

The base member 1 has a receiving means 8, into which a chip-like module unit can be introduced. For that purpose the receiving means 8 has a rectangular opening cross-section with rounded corners, a guide groove 7 and contact elements (not shown) at the receiving means side.

The module unit 20 has a flat, substantially parallelepipedic or card-shaped base body 23 with a connecting device 21 which protrudes from the end face of the base body 20, which is the front end face in the direction of insertion. At the underside the base body 23 has a connected leg-shaped guide element 23 which is oriented centrally in relation to the base body 23 and in the direction of the connecting device 21.

The connecting device 21 is in the form of a plug which contains electrical contact elements (not shown) for electrical/electronic connection to the base member. In this embodiment the plug also serves as a mechanical connecting element: the base member 1 and the module unit 20 are mechanically rigidly connected by virtue of insertion of the connecting device 21 into the receiving means 8. The dimensions of the opening cross-section of the receiving means 8 are adapted to the cross-section of the base body 23. The guide groove 7 is designed to correspond to the guide element 22.

The module unit 20 can be a Bluetooth device, for the wireless transfer of data to suitably equipped terminal units, a memory card with navigation data or mapping cards, a voice recognition device with voice chip which depending on the chip or the data stored therein can space for connections and mechanical actuating elements on the longitudinal and end faces 1a and 1b thereof while on the other hand in the interior of the base member there is sufficient space to integrate the control device partly or entirely into the base member. The control device controls the co-operation of the mobile telephone with other components such as for example loudspeaker, microphone, function buttons, automobile radio and so forth.

For temporarily fixing the cradle-like holding member 11 to the base member 1, provided on the base member 1 are a hook element 6, movable latching hooks 3 and latching pins 4. The hook element 6 is positioned in rigid projecting relationship on the top side in the edge region centrally at an end portion of the elongate base member 1. It faces with the free end edge of the hook 6 in the direction of the oppositely disposed end portion and is rounded or bevelled in the corner regions of the end edge.

The outwardly projecting latching hooks 3 which are movable towards each other are positioned on the top side of the base member 1 in the edge region at a respective longitudinal side in oppositely disposed relationship, facing away from each other with the free ends of the hooks. They are each mechanically connected to the respective elongate release buttons 5 which are fitted into the side surfaces so that, upon actuation of a release button 5, the corresponding latching hook 3 is moved in the direction of the opposite latching hook 3. The return motion in respect of that movement is produced by way of spring force. In another embodiment by way of example it is also possible for the mechanism to be coupled in such a way that the actuation of a release button 5 acts on both latching hooks 3. In modified embodiments there can be provided a common release button for both latching hooks 3.

The protruding latching pins 4 in FIG. 1 are respectively positioned between the latching hooks 3 and the hook device 6 in the edge region on the top side of the base member. They are arranged rigidly in the base member 1 and serve for latched fixing of the holding member 11 in the inserted condition by virtue of the resilient latching hooks 6 engaging into corresponding openings at the underside of the holding member 11 and at respectively process a different language. It can however also be an interface module, for example for USB, serial connections (RS 232), parallel connections, or for the connection of diagnostic devices.

In the illustrated embodiment the contact elements on the module are occupied in accordance with the Table hereinafter.

There are provided connections for various voltage supplies, in this embodiment for two different voltages. The module-side contact elements have connections for the transmission lines of a protocol, in particular a synchronous protocol such as for example the I2C protocol, connections for command lines, in particular for writing and reading enable to a memory unit, for writing protection of an EEPROM and for the command 'address latch enable' for switching over between data and address reception, or address lines, for example for the actuation of a memory unit, in particular an EEPROM, as well as combined address and data lines, for example for the actuation of a flash memory.

| Signal designation | Description | Pin number | Pin number | Description | Signal designation |
|---|---|---|---|---|---|
| 3, 3 P | Supply voltage for the flash memory, EEPROM writing protection | 2 | 1 | Polarisation nose | GND |
| AD1 | Address/data line 1 | 4 | 3 | Address/data line 0 | AD0 |
| AD3 | Address/data line 3 | 6 | 5 | Address/data line 2 | AD2 |

-continued

| Signal designation | Description | Pin number | Pin number | Description | Signal designation |
|---|---|---|---|---|---|
| AD5 | Address/data line 5 | 8 | 7 | Address/data line 4 | AD4 |
| AD7 | Address/data line 7 | 10 | 9 | Address/data line 6 | AD6 |
| A9 | Address line 9 | 12 | 11 | Address line 8 | A8 |
| A11 | Address line 11 | 14 | 13 | Address line 10 | A10 |
| A13 | Address line 13 | 16 | 15 | Address line 12 | A12 |
| A15 | Address line 15 | 18 | 17 | Address line 14 | A14 |
| A17 | Address line 17 | 20 | 19 | Address line 16 | A16 |
| A19 | Address line 19 | 22 | 21 | Address line 18 | A18 |
| A21 | Address line 21 | 24 | 23 | Address line 20 | A20 |
| /WR | Command line: write enable | 26 | 25 | Command line: read enable | /RD |
| 3, 8 PCL | Supply voltage EEPROM | 28 | 27 | Command line: address latch enable | ALE |
| SCL | Protocol line: I2C bus clock for communication with the EEPROM | 30 | 29 | Protocol line: I2C bus data for communication with the EEPROM | SDA |

What is claimed is:

1. A mobile telephone device as part of a hands-free device in a motor vehicle, private automobiles, heavy goods vehicles and other utility vehicles, comprising
an electronic control device for the hands-free device,
a base member (1) which can be installed in the motor vehicle and
an interchangeable holding member for temporarily receiving a mobile telephone,
wherein the base member (1) and the holding member (11) has or have a mechanical connecting device and an electrical and electronic contacting device (10) for the holding member,
characterized in that
there is provided at least one module unit (20) which forms an expansion and memory unit and which has an analog function unit and a digital memory device and a digital function unit,
wherein the base member (1) and the holding member (11) has or have a receiving means (8) for the module unit (20),
wherein the module unit can be inserted into the receiving means (8) while the base member (1) is installed in the motor vehicle,
wherein the receiving means (8) has electrical and electronic contact elements at the receiving means side and the module unit (20) which can be releasably inserted into the receiving means (8) has electrical and electronic contact elements at the module side, which are arranged in corresponding relationship with the contact elements at the receiving means side, and
that when the module unit (20) is engaged in position it is conductingly connected to the control device by way of the contact elements.

2. A mobile telephone device as set forth in claim 1 characterized in that the module unit (20) is a one-piece structural unit and/or is of a closed shape, preferably with a closed casing.

3. A mobile telephone device as set forth in claim 1 characterized in that the base surface of the module unit (20) is rectangular.

4. A mobile telephone device as set forth in claim 1 characterized in that the module unit (20) is in the form of a flat, in particular parallelepipedic body.

5. A mobile telephone device as set forth in claim 1 characterized in that the module unit (20) is in the form of a chip card.

6. A mobile telephone device as set forth in claim 1 characterized in that the module unit (20) does not have any further electrical connecting elements besides the contact elements which cooperate with the contract elements at the receiving means side.

7. A mobile telephone device as set forth in claim 1 characterized in that the base member (1) has an unlocking and/or ejection device for unlocking and/or ejection of the module unit (20).

8. A mobile telephone device as set forth in claim 1 characterized in that in the inserted condition the module unit (20) projects from the base member (1).

9. A mobile telephone device as set forth in claim 1 characterized in that the module unit (20) can be inserted without using a tool and/or without actuation, in particular dismantling, of cover elements.

10. A mobile telephone device as set forth in claim 1 characterized in that the receiving means (8) has a mechanical guide (7).

11. A mobile telephone device as set forth in claim 1 characterized in that the shape of the opening of the receiving means (8) is rectangular.

12. A mobile telephone device as set forth in claim 1 characterized in that the base member (1) has movable latching hooks (3) for fixing the holding member.

13. A mobile telephone device as set forth in claim 1 characterized in that the base member (1) has a hook device (6) for engaging the holding member.

14. A mobile telephone device as set forth in claim 1 characterized in that the base member (1) has a data interface (2), in particular for data exchange by way of RS 232 and Bluetooth and IrDa.

15. A mobile telephone device as set forth in claim 1 characterized in that the base member (1) has a socket (9) for an audio output.

16. A mobile telephone device as set forth in claim 1 characterized in that the base member (1) has a processor.

17. A mobile telephone device as set forth in claim 1 characterized in that the base member (1) is designed independently of the type of mobile telephone and the holding member is designed specifically for the type of mobile telephone.

18. A mobile telephone device as set forth in claim 1 characterized in that the module unit (20) is designed independently of the type of mobile telephones.

19. A mobile telephone device as set forth in claim 1 characterized in that the module unit (20) has an EEPROM and/or a flash memory.

20. A mobile telephone device as set forth in claim 1 characterized in that the module unit has a tab of a thin flexible material for pulling the module unit out of the receiving means.

* * * * *